Figure 1:
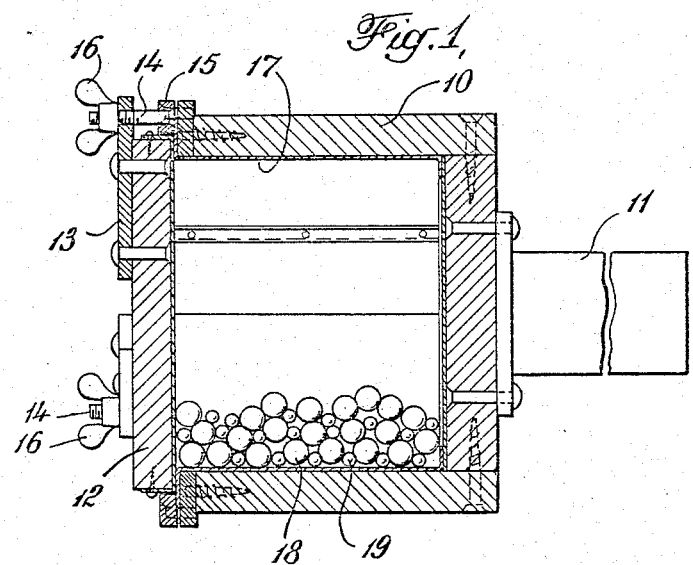

June 19, 1945.    J. W. SKEHAN ET AL    2,378,588
METHOD OF MAKING BEARINGS
Filed March 14, 1942

INVENTORS
Joseph W. Skehan
George J. Agule
BY
Pennie Davis Marvin Edwards
ATTORNEYS Patented June 19, 1945

2,378,588

UNITED STATES PATENT OFFICE 2,378,588

METHOD OF MAKING BEARINGS

Joseph W. Skehan and George J. Agule, Stamford, Conn., assignors to Machlett Laboratories Incorporated, Springdale, Conn., a corporation of Connecticut Application March 14, 1942, Serial No. 434,648

6 Claims. (Cl. 117—109)

This invention relates to the manufacture of bearings of the ball and roller types and is concerned more particularly with a novel method of making bearings which give long and reliable service under operating conditions of such severity as to cause rapid wear and failure of bearings previously used. Bearings made by the new method may be advantageously employed in apparatus in which, for various reasons, lubricant cannot be supplied to the bearings under such conditions as to insure continual maintenance of the lubricant film between the working surfaces of the bearing members and those members from time to time run in metallic contact. Such bearings are also capable of giving satisfactory service in vacuum tube apparatus for supporting rotating members which cannot usually be lubricated by means of conventional lubricants because of vaporization of the latter during operation. The invention, accordingly, comprehends both a method of making bearings suitable for general purposes and a method of making vacuum tube apparatus in which a rotating part is mounted in one or more bearings within an evacuated envelope, an example of such an apparatus being an X-ray tube having a rotating anode.

Bearings serving the purposes referred to are disclosed in our co-pending applications Serial No. 260,884, filed March 10, 1939, and Serial No. 431,706, filed February 20, 1942, the later application being a continuation-in-part of the earlier. Those bearings comprise bearing members consisting of races and elements, such as balls or rollers, rolling between the races. The contacting working surfaces of the bearing members are made of a hard metallic substance, as, for example, alloy steels containing such alloying ingredients as tungsten, molybdenum, chromium, and the like, and the working surfaces of one or both of the bearing members are provided with an extremely thin film of a substance which has a low affinity for the materials of which the surfaces are formed and is softer than those materials. Thus, the working surfaces of either the races or the balls or rollers or both may carry the minute layer, but application of the layer to the surfaces of the balls or rollers is preferred because it is somewhat easier to apply the material to those surfaces. The substance employed for the coating layer is a metallic material and has a vapor pressure suitable for the conditions of operation and, preferably, relatively low.

Since the coating layer applied in the new bearing to the balls, for example, is to be made of a substance having a low affinity for the substance of which the surfaces of the races are formed, the appropriate coating substance for use in a particular bearing will depend on the materials of which the surfaces of the bearing members are made. Ordinarily bearings are made of steels of different types and, accordingly, in most instances, the coating substance will be one having a low affinity for iron and the suitability of the coating material may be determined by reference to its degree of solubility in iron. Among the metals which have a low affinity for iron are silver, lead, tellurium, bismuth, thallium, magnesium, and indium and one or the other of these metals will be employed as the coating in a steel bearing. Silver is preferred because it gives excellent results in service and has a sufficiently low vapor pressure to permit its use in bearings to be operated in evacuated spaces at elevated temperatures.

The film of the coating substance employed in our bearing must be of minute thickness, since if the substance is present in too thick a layer, it forms lumps during the operation of the bearing and the bearing members stick together. The film must also be continuous throughout the entire working surface of the bearing member to which it is applied and it must be tenacious, so that it will remain in place indefinitely.

The present invention is, accordingly, directed to the provision of a method for the production of bearings of the type above described in a simple expeditious manner and it involves operations by which the desired coating substances may be applied to form films of the specified characteristics on the working surfaces of bearing members.

According to the new method, a film of the selected material is applied to the working surfaces of the bearing member by placing the material and the surfaces in contact and causing the material and surfaces to be rubbed and pressed together. Under proper conditions, the material then appears to be caused to flow into the minute crevices and cavities of the surface and the union of the film to the surfaces closely resembles that known as a "cold weld," which is a weld effected at room temperatures or slightly above by the use of pressures adequate to effect appreciable permanent deformation of at least one of the materials involved. The operations may be carried on in air, but it is preferable to outgas the surfaces on which films are to be applied prior to the application of the films. For this purpose, the bearing members to receive surface coatings and the coating material may be subjected to heat and vacuum and the coating operations then carried on while the vacuum is maintained.

Figure 2:
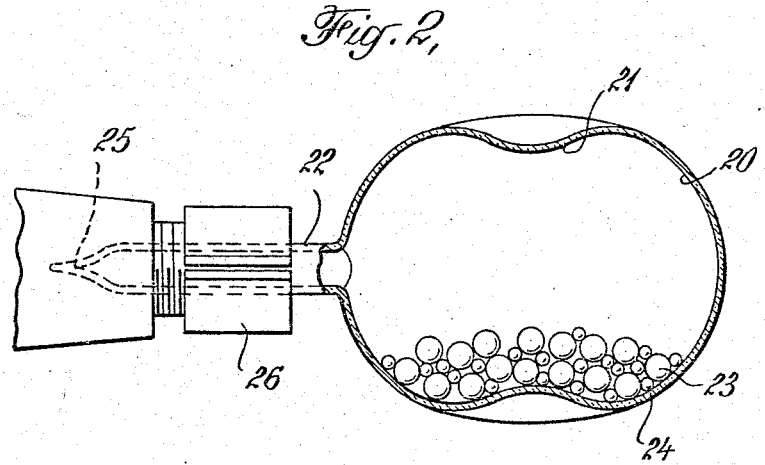

The method of the invention may be practiced in various ways and for a better understanding of the operations involved, reference may be had to the accompanying drawing in which Fig. 1 is a view partly in longitudinal section and partly in elevation of one form of apparatus in which the new method may be practiced; and Fig. 2 is a similar view of a modified form of such apparatus.

The apparatus illustrated in Fig. 1 comprises a barrel 10 made of wood or other suitable material herein illustrated as of hexagonal section. At one end, the bearing is provided with a sleeve 11 mounted coaxially therewith and serving as a means by which the barrel can be mounted on a shaft for rotation. The other end of the barrel is closed by a removable cover 12 held in place in any convenient manner as by a plurality of plates 13 attached to the cover and projecting beyond the edge thereof. Through each plate passes a screw 14 attached to a plate 15 on the end of the barrel and a wing nut 16 threaded on the screw bears against the plate 13 to hold the cover tightly in position. The inner wall of the barrel and cover are preferably provided with a lining 17 of the material which is to be applied in the barrel to the bearing members.

In the operation of the apparatus for applying a coating of silver, for example, to the surfaces of steel balls, the balls 18 and fine pieces or shot 19 of silver are introduced into the barrel in suitable proportions. Thus, with balls of hard alloy steel about ¼" in diameter and shot of silver about $\frac{1}{16}$" in diameter, about 135 balls together with about 200 grams of shot may form the charge. The barrel is rotated at about 100 R. P. M. and the tumbling continued for at least 40 hours, as, for example, from 44 to 48 hours. In the tumbling operation, the balls and shot strike against one another repeatedly and also rub upon one another and, as the operation proceeds, it may be observed by means of a microscope that the high points on the surfaces of the balls are gradually removed and the silver is forced into the minute crevices and cavities on the ball surfaces.

The apparatus illustrated in Fig. 1 is operated with the balls and shot exposed to atmospheric pressure and when it is desired to outgas the surfaces of the balls prior to application of the coating films thereon, the apparatus illustrated in Fig. 2 is employed. This apparatus includes an envelope 20 preferably made of glass and of globular form with indentations indicated at 21. The envelope has a stem 22 by which it may be connected to a vacuum pump and to prepare the apparatus for operation, a charge of balls 23 to be coated is introduced into the stem and the envelope, together with a quantity of small pieces 24 of the coating material, and the stem is then connected to a vacuum pump and the envelope heated. The combined heating and pumping result in the removal of occluded gases from the surfaces of the balls and after this operation has been carried on to the desired extent, the stem is sealed off the pump, as indicated at 25.

The sealed envelope is then mounted by means of the stem in a chuck 26 which can be rotated by suitable drive means and, during such rotation, the balls and pieces of coating material are tumbled together. The tumbling operation causes the balls to pick up a thin layer of the coating material on their surfaces by pressing and rubbing action, and when the tumbling has been continued for the desired length of time, the envelope is opened and the balls are removed. These balls are then assembled between inner and outer races to complete the bearing.

The coating substances, which are to be applied to form the lubricant film in our bearing, vary somewhat in softness and the apparatus illustrated in Figs. 1 and 2 are best adapted for the application of the softer of those metals, for example, silver. In applying coating substances having different physical characteristics, such as tellurium, for example, by the pressure and rubbing operations of the new method, satisfactory results have been obtained by the specific form of the new method disclosed in a co-pending application of Machlett, Serial No. 349,021, filed July 31, 1940. In the practice of the Machlett form of the method, the bearings are placed within an envelope and subjected to heat and vacuum to remove occluded gases, after which the bearings are operated with the balls rolling in contact with an element made of the coating substance. As the operation proceeds, the rubbing of the balls against the element under pressure causes the balls to take up thin films of the coating substance on their surfaces and the films are distributed over the entire surfaces of the balls. When the coating operation has been carried on to produce films of the desired thickness, the bearings are taken out of the envelope and the element formed of the coating substance is removed from contact with the balls. The balls may then be used with the races in which they have been running during the coating operation or may be employed in other races.

In the application of the coatings to the bearing members in accordance with the new method, the films of coating substance applied are extremely thin. We are aware of no method by which the thickness of the effective portions of the film, that is, of the portions overlying those parts of the surfaces of the bearing members which would make direct contact but for the presence of the film, can be accurately determined, but some idea of the thickness can be gained from the following. When a film of silver of proper thickness is applied, for example, to the steel balls of a ball bearing, in accordance with the new method, the bearing containing the balls will run for an indefinite period without any indication of transfer of the silver from the balls to the surfaces of the races. If the thickness of the film is too great, the substance in the film is likely to form lumps as the bearing operates and this will cause the balls or rollers to stick together, so that the bearing will not operate smoothly. As a body of silver of proper thickness is susceptible to plastic deformation under appropriate conditions and portions of a film of silver on the balls that are too thick will transfer to the races, it appears that a film of proper thickness is one that is too thin to permit plastic deformation. It is our belief, accordingly, that the effective portions of a satisfactory film are built up of a few layers of atoms.

While the use of the pure metals for the films on the bearing surfaces of our bearing has been found to give the best results, alloys of metals of low affinity for the materials forming the surfaces on which the coated bearing members are to run have given approximately as good results. Hence, the term "lubricating metal" is used in the appended claims to refer to alloys as well as to pure metals. Also, certain alloys of low affinity and high affinity metals have given reasonably good results. Such alloys may be applied to the bearing members in the form of films by the pressure and rubbing operations of the method of the invention and the apparatus to be used in the practice of the method in any particular case will depend on the characteristics of the alloy to form the coating.

This application is a continuation-in-part of our co-pending applications Serial No. 312,484, filed January 5, 1940, and Serial No. 362,732, filed October 25, 1940, the earlier of these applications being a division of application Serial No. 260,884, filed March 10, 1939.

We claim:

1. In a method of making bearings comprising bearing members including races and elements rolling between the races, the elements and races each having working surfaces formed of a hard ferrous alloy, the steps of placing the working surfaces of the rolling elements in contact with relatively small pieces of silver, rubbing and pressing the working surfaces of the rolling elements and the small pieces of silver against one another until a desired thin, continuous and tenacious film of silver has been distributed over the entire working surface of each element, and then discontinuing said rubbing and pressing operations.

2. In the method of making bearings comprising bearing members including races and elements rolling between the races, the elements and races each having working surfaces formed of a hard ferrous alloy, the steps of subjecting the rolling elements to heat and vacuum to remove occluded gases from the surface thereof and, while the vacuum is maintained, placing the working surfaces of said rolling elements in contact with relatively small pieces of silver, and rubbing and pressing the working surfaces of the rolling elements and the relatively small pieces of silver against one another until a desired thin, continuous and tenacious film of silver has been distributed over the entire working surface of each element, and then discontinuing said rubbing and pressing operations.

3. In a method of making bearings comprising bearing members including races and elements rolling between the races, the elements and races each having working surfaces formed of a hard ferrous alloy, the steps of placing the working surfaces of the rolling elements in contact with relatively small pieces of a metal having a low affinity for the hard ferrous alloy and capable of acting as a lubricant for the bearing members, rubbing and pressing the working surfaces of the rolling elements and the relatively small pieces of the lubricating metal against one another until a desired thin, continuous and tenacious film of the lubricating metal has been distributed over the entire working surface of each element, and then discontinuing said rubbing and pressing operations.

4. In a method of making bearings comprising bearing members including races and elements rolling between the races, the elements and races each having working surfaces formed of a hard ferrous alloy, the step of tumbling the rolling elements with relatively small pieces of a lubricating metal having a low affinity for the hard ferrous alloy until a desired thin, continuous and tenacious film of the lubricating metal has been distributed over the entire working surface of each element, and then discontinuing said tumbling operation.

5. In a method of making bearings comprising bearing members including races and elements rolling between the races, the elements and races each having working surfaces formed of a hard ferrous alloy, the steps of subjecting the rolling elements to heat and vacuum to remove occluded gases from the surfaces thereof, and, while the vacuum is maintained, placing the working surfaces of said rolling elements in contact with relatively small pieces of a metal having a low affinity for the ferrous alloy and capable of acting as a lubricant for the bearing members, rubbing and pressing the working surfaces of the rolling elements and the relatively small pieces of the lubricating metal against one another until a desired thin, continuous and tenacious film of the lubricating metal has been distributed over the entire working surface of each element, and then discontinuing said rubbing and pressing operations.

6. In a method of making vacuum tube apparatus, such as an X-ray tube, comprising a rotor mounted in bearings on a support within an evacuated envelope, the bearings comprising races and elements rolling between the races, the elements and races having surfaces made of a hard ferrous alloy, the steps of placing the working surfaces of the rolling elements in contact with relatively small pieces of a metal having a low affinity for the hard ferrous alloy of which the surface of said elements are formed and capable of acting as a lubricant for the bearings, rubbing and pressing the working surfaces of the rolling elements and the relatively small pieces of lubricating metal against one another until a desired thin, continuous and tenacious film of the lubricating metal has been distributed over the entire working surface of each element, and then discontinuing said rubbing and pressing operations.

JOSEPH W. SKEHAN.
GEORGE J. AGULE.